July 30, 1940.                F. E. COLBY                2,209,644
                            KNOB OR THE LIKE
                          Filed Oct. 9, 1939
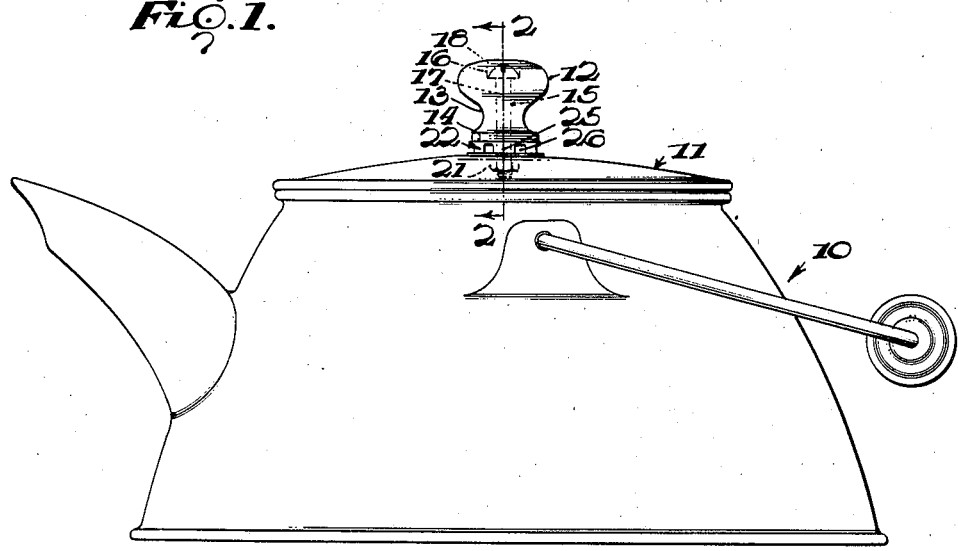
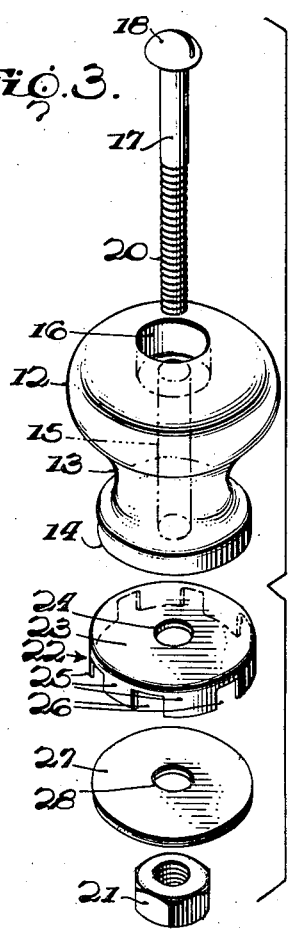
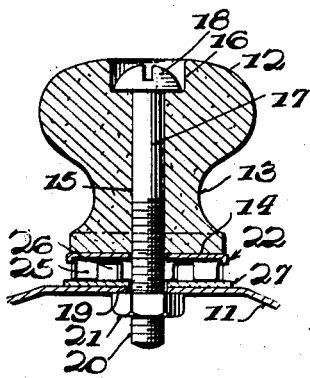
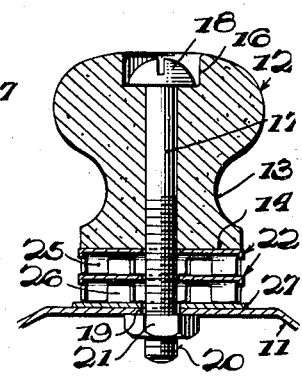
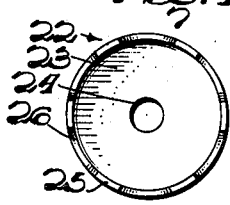
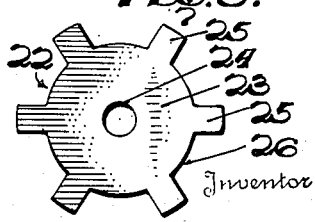
Fred E. Colby.

Patented July 30, 1940

2,209,644

UNITED STATES PATENT OFFICE 2,209,644

KNOB OR THE LIKE

Fred E. Colby, Penacook, N. H.

Application October 9, 1939, Serial No. 298,698

1 Claim. (Cl. 16—118)

My invention relates to knobs or the like to be applied to elements which are heated.

An important object of the invention is to provide simple and inexpensive means for affording the circulation of air between the heated element and the knob, thus properly preventing the heat transfer.

A further object of the invention is to provide a heat insulating element which is of simple construction, cheap to manufacture, and neat in appearance.

A further object of the invention is to provide a device of the above mentioned character constructed in units, so that any number of units may be employed.

Other objects and advantages of the invention will be apparent during the course of the following description.

In the accompanying drawing forming a part of this application and in which like numerals are employed to designate like parts throughout the same, Figure 1 is a side elevation of a kettle having a lid or cover equipped with my improved knob, Figure 2 is an enlarged vertical section taken on line 2—2 of Figure 1, Figure 3 is an exploded perspective view of the knob and associated elements, Figure 4 is a bottom plan view of the body portion of the heat insulating unit, Figure 5 is a similar view of a blank from which the body portion of the device is formed, and, Figure 6 is a view similar to Figure 2, showing a plurality of heat insulating units in use.

In the drawing, wherein for the purpose of illustration is shown a preferred embodiment of my invention, the numeral 10 designates a kettle, having a removable lid or cover 11. This kettle and lid 11 is formed of metal, as is well known. The numeral 12 designates a knob which may be formed of some material which is a poor conductor of heat such as wood, Bakelite, or the like. The knob 12 has a shank 13, provided at its lower end with a flat face 14. The knob 12 has a central vertical opening 15 and a recess 16, as shown. A screw 17 extends through the opening 15 and has a head 18 arranged within the recess 16. The screw 17 extends through an opening 19 in the lid 11 and has a screw-threaded portion 20, carrying a nut 21.

As clearly shown in Figures 1 and 2, a heat insulating unit 22, is arranged between the flat face 14 and the lid 11. This heat insulating unit is preferably formed of metal, such as brass, and is preferably cylindrical. The heat insulating unit 22 includes a circular top or upper disc 23, having a central opening 24, to receive the screw 17.

The disc 23 is provided with a depending annular set of tongues or teeth 25, affording openings 26, for the circulation of air. The tongues or teeth 25 are mounted upon a lower disc or end 27, having a central opening 28 to receive the screw 17. It is thus seen that the heat insulating unit is in the nature of a cylindrical shell, having a top and bottom, and a periphery provided with openings, for the free passage and circulation of air. In forming the heat insulating unit a blank is first stamped from sheet metal having the spaced tongues 25 which extend radially. These tongues are subsequently bent at a right angle to the top or disc 23, to form the periphery of the body portion of the shell, having the openings 26.

In Figure 6, I have shown a modification of the invention, wherein two of the heat insulating units 22 are employed, in spaced superposed relation. Any suitable number of these heat insulating units may be employed. All other parts remain identical with those shown and described in connection with Figures 1 and 2.

While I have shown the heat insulating unit as cylindrical, the same may be formed in any desired shape and is preferably made in the shape corresponding to the shape of the knob in connection with which it is to be used.

It is to be understood that the forms of my invention herewith shown and described are to be taken as preferred examples of the same and that various changes in the size, shape, and arrangement of parts may be resorted to without departing from the spirit of my invention or the scope of the subjoined claim.

Having thus described my invention, what I claim is:

In a device of the character described, a solid knob formed of wood or the like to be secured to an element which is heated in use, said element having an opening, said knob having an inner end provided with a flat face, said knob having an opening extending through the flat face, a heat insulating device arranged between the inner end of the knob and the element, said device including a shell comprising an end having an opening and a periphery, said end being flat and engaging the flat face and being of substantially the same diameter as said inner end, said periphery being provided with spaced openings which extend from said end through the opposite end of the periphery for forming spaced teeth, the free ends of the teeth being spaced and arranged next to said element for thereby reducing the area of contact between the device and said element, and a bolt passing through the openings in the knob, end and element.

FRED E. COLBY.